Feb. 2, 1954          B. T. HENSGEN          2,668,114

MARGARINE COLORING (PELLET LOCATING)

Filed May 7, 1951

INVENTOR.
Bernard T. Hensgen
BY
R. G. Story
ATTORNEY

Patented Feb. 2, 1954

2,668,114

UNITED STATES PATENT OFFICE 2,668,114

MARGARINE COLORING (PELLET LOCATING)

Bernard T. Hensgen, Chicago, Ill., assignor to Swift & Company, Chicago, Ill., a corporation of Illinois Application May 7, 1951, Serial No. 225,018

5 Claims. (Cl. 99—148)

The present invention relates generally to the inclusion of a substance within a deformable, plastic mass of another material, and more particularly to a method of inclosing a substance in close and intimate relationship with such a plastic mass.

The particular problem towards which the present invention is directed is the inclusion, within a plastic mass of oleomargarine or the like, of a coloring substance adapted to uniformly color the mass.

The general application of various coloring means to margarine is well known in the art and no claim is laid herein to the conventional method of mixing margarine with coloring material. However, prior art suggestions for coloring margarine have met with various drawbacks. The most common method today is perhaps the method wherein a gelatin capsule containing the oil-soluble coloring dye is affixed to an interior wall of the margarine package. This method presents a rather difficult problem in obtaining a uniform dispersal of color throughout the margarine when the color-containing pellet is ruptured and the plastic mass kneaded to intimately mix the color with the margarine. Since the color is applied essentially to one point only on the exterior of the plastic mass, such point and the margarine immediately surrounding and beneath such point is usually more highly colored than other portions of the margarine remote from such point unless a long and tedious kneading process is carried out.

One solution to this problem of uniform dispersion would be to incorporate the color pellet in the approximate center of the plastic margarine mass. The conventional oil-soluble coloring used in the art would of course be unsuitable for this purpose since, unless protected by a gelatin coating or the like, it would gradually disperse throughout the margarine and present an undesirable splotched surface appearance to the margarine print. A gelatin coating would likewise be undesirable since, upon rupturing of the coating to release the coloring material, the coating would remain in the margarine and would be offensive to the average consumer.

One type of coloring capsule suitable for inclusion within a print of margarine is, however, described and claimed in my copending application, Serial No. 94,749, filed May 21, 1949, and entitled Coloring Agent for Plastic Materials, now Patent No. 2,610,917. Such a capsule in general consists of an oil-soluble dye contained within a water-soluble coating. The oil-soluble coloring ingredient, such as Yellow AB, also known as FD & C#3 (1-phenylazo; 2-naphthylamine) is included as an aggregate mass in the interior of the capsule. The exterior is formed of a coating, such as heavy bodied pastes of salt and sugar dispersed in glycerin or wheat or soybean flour dispersed in glycerin to which has been added suitable water-soluble dye or coloring material, such as saffron in water-soluble form or tumeric in water-soluble form. The water-soluble coloring material may be used as a paste or pellet without the coating of water-insoluble material.

One method of incorporating the coloring material in the margarine is to form a hole in the margarine, insert the coloring material in the hole, and then close the hole. Difficulty has been encountered in depositing the pellet, paste, or liquid in a hole drilled or punched into the margarine print and closing the opening through which the color was deposited so as to prevent leakage of coloring material.

It is therefore an object of the present invention to provide a method for the inclusion of a pellet or the like within a plastic mass.

It is a further object of the invention to provide a method for incorporating color pellets or the like within a body of margarine or the like which overcomes the disadvantages of the prior art.

Additional objects, if not specifically set forth herein, will be readily apparent to one skilled in the art from the following detailed description of the invention.

Generally, the present invention contemplates the provision of a method for inclosing a pellet within a plastic body wherein the amount of air occluded with the pellet is at a minimum and the pellet is maintained in intimate contact with the plastic body.

It has been found in the manufacture of margarine prints having pellets inserted therein that one of the reasons for the objectionable leakage of color upon standing is the occlusion of air within the pellet-containing space upon closure thereof. This entrapped air, upon subsequent compression of the print into the so-called "western flat," i. e., the usual form in which margarine is displayed for sale, comprising essentially a flat, rectangular configuration, tends to seek an escape from within the body of the margarine. Thus, minute air channels or pockets are formed within the product and subsequent handling and shipment thereof causes the liquid or paste color to flow from the interior of the margarine mass through these channels to the surface of the product, contaminating both the surface of the margarine and the packaging material in contact therewith. The second reason discovered for the leakage of the coloring material from the interior of the margarine is that the space within which the pellet is contained is not completely closed by the usual manner of filling the hole through deposition of additional margarine therein, due to the entrapped air, and the body of coloring agent is thus permitted some movement within the body of margarine. This movement augments the tendency of the coloring material to disperse into and through the margarine.

The present invention comprises essentially the initial displacement (not removal) of some of the plastic material to form a pellet-introducing channel extending to about the center of the plastic mass, depositing a color body therein, thereafter applying lateral pressure to the margarine immediately above the color body to close off the body from the rest of the channel and gradually raising the point of pressure application towards the top of the channel to effectively and gradually close the channel through lateral displacement of the plastic material from the bottom towards the top, whereby essentially all of the air within the channel is forced from the plastic material and the coloring agent is inclosed in intimate contact with the plastic material.

Figure 1:
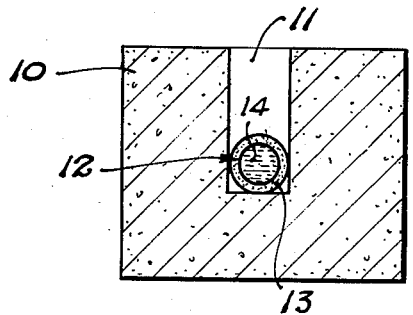
Figure 1 represents a cross-sectional end view of a print of margarine showing a pellet-introducing channel formed therein.

Referring now to Figure 1, the margarine print 10 has formed, in the approximate center thereof, a depression or pellet-introducing channel 11. This may be formed in any suitable manner, by a drill, punch, or the like, but only by displacement of margarine within the body of the print and not by actual removal therefrom. Within this channel is deposited a body 12 of coloring material such as a pellet, preferably one having a water-soluble coating surrounding an oil-soluble coloring material as disclosed in my copending application hereinbefore referred to. The water-soluble coating is represented in Figure 1 by the numeral 13 while the completely inclosed oil-soluble dye is represented by numeral 14. The pellet 12 will be seen to lie at the bottom of channel 11 in the approximate center of the margarine mass.

Figure 2:
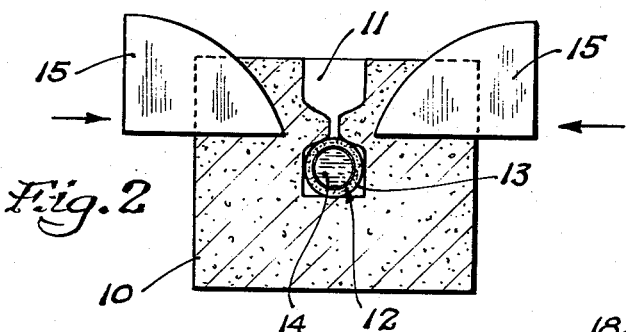
Figure 2 illustrates an intermediate step in the method of closing the pellet-introducing channel of Figure 1 in accordance with the present invention.
Figure 3:
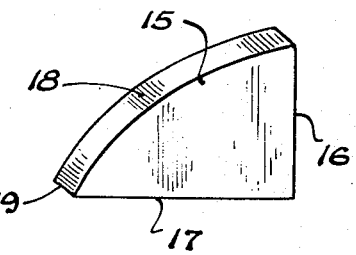
Figure 3 is a perspective view of one form of die or pressure-applying means which may be used to carry out the method of the present invention.

Referring now to Figures 2 and 3, the first step in the present method of closing the pellet-introducing channel 11 is illustrated. Although the present invention is not to be considered limited to any particular means for effecting closure of channel 11, one form of die or pressure-applying member is illustrated by numerals 15. These comprise a pair of semi-arcuate members adapted to be moved laterally into the margarine print to laterally displace some of the margarine inwardly towards the center of the print. These members which are illustrated in Figure 3 and more fully described in connection therewith, are applied to the print 10 of margarine after pellet 12 has been deposited at the base of channel 11. As clearly shown in Figure 3, the members 15 comprise essentially a die having the form of a quadrant of a circle with radii 16 and 17 defining one side and the base of the die and the arc between the ends of the two radii defining an edge of the pressure-applying surface 18 of the die. A glance at Figure 2 of the drawings illustrates that a die of this configuration when moved laterally inward in the direction of the arrows of Figure 2, will apply pressure first with the end 19 of the base 17. The mechanism of moving such a die inwardly to a predetermined point and then pivoting the die about the innermost point of its surface in relation to the material being treated as illustrated in Figure 4 does not form part of the present invention and may be by operation of any suitable means such as, for example, a cam track and associated linkage connecting the cam track with the die member.

Figure 4:
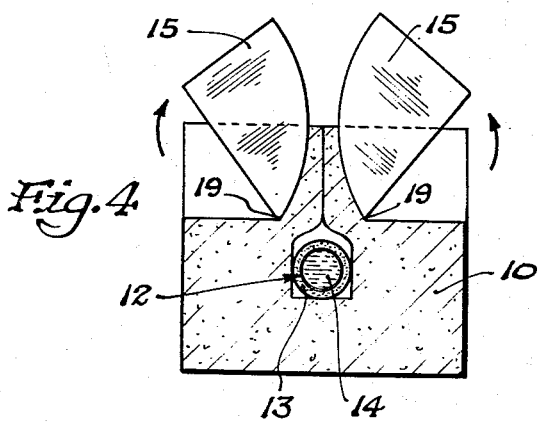
Figure 4 illustrates the final step in the present method of closing the pellet-introducing channel.

Referring now to Figure 4, the die members 15, after being forced laterally inward to a point just beyond that shown in Figure 2, i. e., until the material displaced by end 19 of the die members completely closes off the channel 11 immediately above the pellet, are rotated upwardly about end 19 of each member in the manner indicated by the arrows in Figure 4. Due to the arcuate construction of the pressure-applying surfaces of the dies, such a movement of the die members effects an application of pressure successively upwards along the channel 11, closing the channel from its initial point of closure immediately above pellet 12 gradually outwardly to the exterior surface of print 10.

It will be seen from the drawings and the foregoing description that the present method, by applying the initial lateral pressure immediately above the pellet, closes off the pellet in a very confined space having very little air occluded therein, and, by gradually raising the point of pressure application, in effect, squeezes the air contained within the pellet-introducing channel outwardly from the body of the plastic material as the channel closes from the bottom towards the top.

The invention, while described in connection with and primarily applicable to the inclosure of coloring material within a print of margarine, is obviously applicable to any situation wherein it is desirable to inclose one substance within another plastic and deformable material as, for example, shortening, or the like. Furthermore, while the pressure-applying elements illustrated herein have an arcuate pressure-applying surface, it is obvious that a flat pressure-applying surface would be capable of use, i. e., the die member would be triangular in shape, or that any other suitable means for applying pressure in the gradient manner of this method could be used.

The prints containing the coloring material inclosed by the present process within their mass may thereafter be deformed or manipulated into desired configurations without danger of air channels forming to the surface of the mass through pressure from air trapped with the pellet. For example, one of the margarine prints illustrated in the drawings, upon completion of the present method, may be placed in a mold or shaping member and compressed into the so-called "western flat" without the danger of premature coloration of the margarine.

It will be understood that the term "print" as used herein refers to a rectangular block of margarine having substantially a square cross-section as disclosed in the drawings, whereas in the "western flat" the width of the block of margarine is substantially greater than the depth.

Obviously, many modifications and variations of the invention as hereinbefore set forth may be made without departing from the spirit and scope thereof, and therefore only such limitations should be imposed as are indicated in the appended claims.

I claim:

1. The method of inclosing an edible substance within a mass of deformable, plastic, edible material which comprises: displacing without removing a portion of such plastic material to provide an opening extending from the exterior to the interior of the mass; depositing the substance to be inclosed therein, applying lateral pressure to said plastic material immediately above said deposited substance to seal off said substance from said opening, and thereafter gradually raising the point of application of such lateral pressure to effect a closing of said opening from the bottom towards the top.

2. The method of inclosing an edible substance within a mass of deformable, plastic, edible material which comprises: forming a depression in said plastic material, by displacement of a portion of said material, without removing such material extending inwardly to the approximate center of said mass; depositing the substance to be inclosed at the base of such depression; displacing a portion of the plastic material immediately above the substance deposited in said depression in such a manner as to seal off said substance from the rest of said depression; and thereafter displacing successive portions of said plastic material into said depression to effect a gradual closure of said depression from the interior towards the exterior of said mass.

3. The method of inclosing an edible substance within a mass of deformable, plastic, edible material which comprises: displacing without removing a portion of said plastic material to form a depression extending inwardly to the approximate center of said mass; depositing the substance to be inclosed at the innermost portion of said depression; applying lateral pressure to the plastic material surrounding said depression at a point immediately above said deposited substance whereby said material is displaced into said depression to seal off the base portion thereof; and thereafter gradually raising the point of application of said lateral pressure to successively displace further plastic material into said depression whereby said depression is filled from the bottom to the top in such a manner as to be substantially free from occluded air spaces.

4. A method as in claim 3 wherein the deformable, plastic, edible material is margarine.

5. A method as in claim 4 wherein the substance deposited is a coloring pellet.

BERNARD T. HENSGEN.

References Cited in the file of this patent

UNITED STATES PATENTS

| Number | Name | Date |
|---|---|---|
| 745,213 | Martin | Nov. 24, 1903 |
| 1,219,254 | Clulee | Mar. 13, 1917 |
| 1,871,837 | Brown | Aug. 16, 1932 |
| 1,940,564 | Schilling | Dec. 19, 1933 |
| 2,454,420 | Adler | Nov. 23, 1948 |
| 2,539,457 | Metheny | Jan. 30, 1951 |